United States Patent [19]

Litz

[11] 4,060,742
[45] Nov. 29, 1977

[54] SUPERCONDUCTIVE DYNAMOELECTRIC MACHINE WITH IMPROVED CRYOGENIC SUPPORT ARRANGEMENT

[75] Inventor: Donald C. Litz, Monroeville, Pa.

[73] Assignee: Westinghouse Electric Corporation, Pittsburgh, Pa.

[21] Appl. No.: 645,588

[22] Filed: Dec. 31, 1975

Related U.S. Application Data

[63] Continuation of Ser. No. 398,023, Sept. 17, 1973, now Defensive Publication No. T934,001.

[51] Int. Cl.² .............................................. H02K 9/00
[52] U.S. Cl. ...................................... 310/52; 310/91; 310/114
[58] Field of Search ................... 310/10, 40, 261, 52, 310/112, 114, 115, 261, 262, 273, 53, 55, 65, 59, 91

[56] References Cited

U.S. PATENT DOCUMENTS

| | | | |
|---|---|---|---|
| 3,368,087 | 2/1968 | Madsen | 310/10 |
| 3,742,265 | 6/1973 | Smith | 310/52 |
| 3,816,780 | 6/1974 | Smith | 310/52 |
| 3,942,053 | 3/1976 | Abolins | 310/10 |
| 3,944,865 | 3/1976 | Jewitt | 310/114 |

FOREIGN PATENT DOCUMENTS 1,215,805  5/1966  Germany .............................. 310/114

Primary Examiner—R. Skudy
Attorney, Agent, or Firm—J. W. Keen

[57] ABSTRACT

A superconducting dynamoelectric machine has a cryogenic portion of the rotor supported on the ambient temperature portion of the rotor by relatively long and thin spokes. The spokes extend between the ambient temperature portion and a flange located on a cryogenic temperature portion. The materials of the flange and spokes are selected so that contraction of the spokes along their length will be compensated for by contraction of the flange in that direction. Contraction in the transverse direction is compensated for by an appropriate displacement of the end of the spoke connected to the ambient temperature portion. Alignment and tension of the spoke is accurately achieved by an appropriate adjusting arrangement.

12 Claims, 3 Drawing Figures

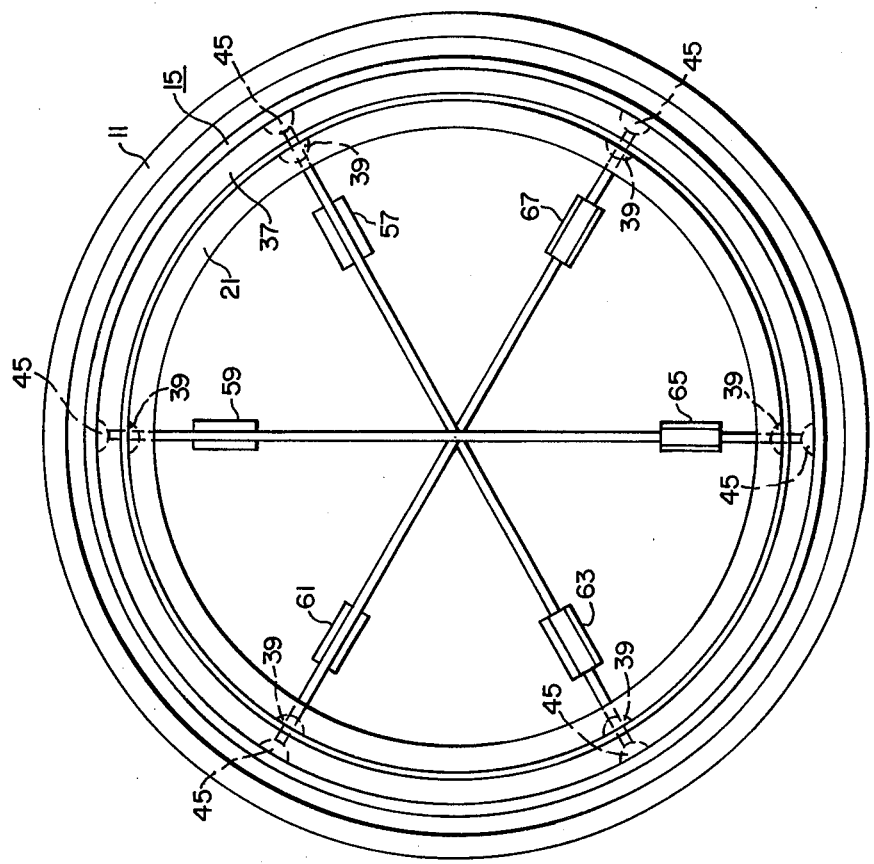
FIG. 3.
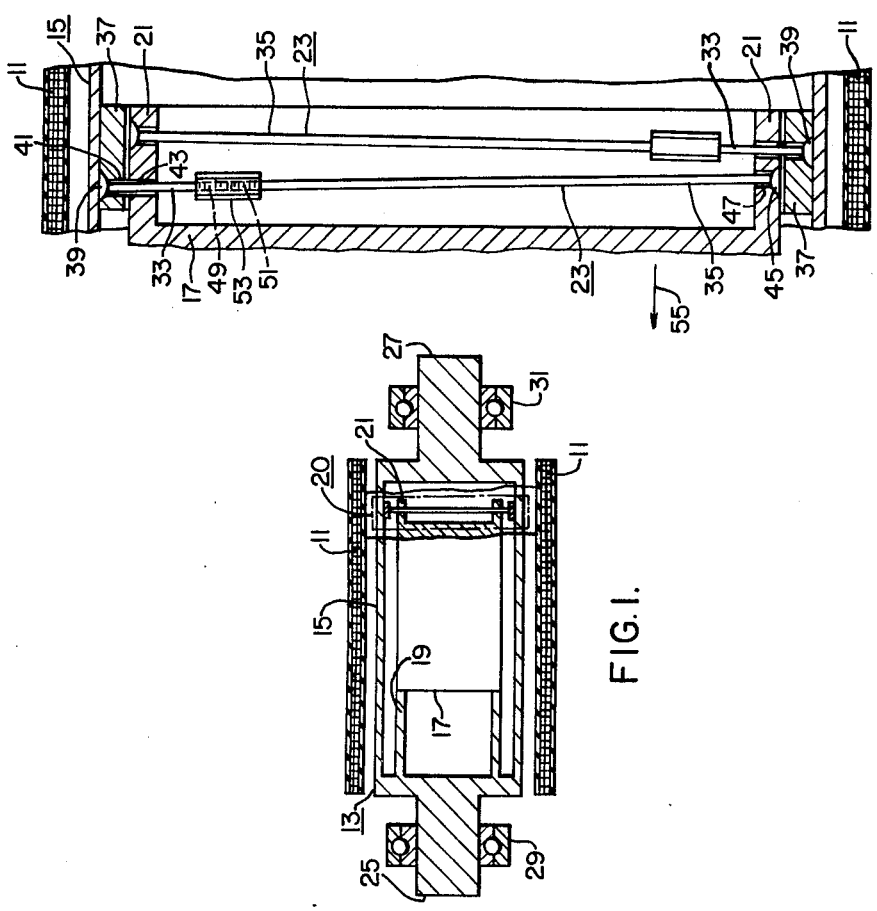
FIG. 2.
FIG. 1.

SUPERCONDUCTIVE DYNAMOELECTRIC MACHINE WITH IMPROVED CRYOGENIC SUPPORT ARRANGEMENT

This is a continuation of application Ser. No. 398,023 filed Sept. 17, 1973, now Defensive Publication No. T 934,001.

BACKGROUND OF THE INVENTION

1. Field of the Invention

This invention relates generally to superconducting dynamoelectric machines, and more specifically, this invention relates to a superconducting dynamoelectric machine having an improved arrangement for supporting a cryogenic temperature portion of the rotor on an ambient temperature portion of the rotor.

2. Description of the Prior Art

Superconducting dynamoelectric machinery having a rotating superconductive field winding requires a stable support for the cryogenic portion of the rotor, while still limiting heat conduction from the ambient temperature portion of the rotor to the greatest extent possible. In prior art cryogenic structures (Dewar vessels), an outer ambient temperature structure has a fill tube passing through it to convey the cryogenic material to an inner cryogenic temperature portion. The fill tube is affixed to the ambient temperature structure to provide support for the cryogenic temperature portion. In addition, thin wires or spokes are utilized to help support the cryogenic temperature portion. The cryogenic temperature portion is surrounded by a vacuum to eliminate convection losses and the surfaces of the inner and outer walls are highly polished to lower radiation losses. Heat conduction to the cryogenic temperature portion is directly proportional to the cross-sectional area divided by the length of the supports linking the ambient temperature and cryogenic temperature portions. Long thin supports are therefore used to reduce conduction losses, which would otherwise result in excessive "boiloff" of the cryogenic material.

However, in a stationary Dewar vessel the support is only required to support the weight of the assembly and is not required to provide precision placement of the cryogenic temperature portion with respect to the ambient temperature portion. On the other hand in a rotating Dewar assembly, such as a cryogenic portion of the superconducting machine rotor, the cryogenic temperature portion must be supported for static and dynamic loads. The superconducting field winding located in the cryogenic temperature portion may have a significant mass. Thus, the supporting arrangement for the cryogenic temperature portion must: transmit machine torque from the field winding to the prime mover; maintain the concentricity of the ambient temperature and cryogenic temperature portions; absorb axial thermal distortion; and limit heat losses to the cryogenic temperature portion. One way to accomplish this is to use a tubular support for one end of the cryogenic temperature portion to provide the torque transmittal capability, while the other end is supported by spokes to absorb axial thermal distortion and limit heat losses. The use of such spokes is illustrated, for example, in U.S. Pat. No. 3,368,087 — Madsen. However, high stresses would be developed in the spokes because of their thermal contraction when the cryogenic temperature portion is cooled to cryogenic temperature from ambient temperature. These high stresses raise the possibility of spoke breakage under dynamic loading conditions. Further, these stresses could lead to undesired repositioning of the cryogenic temperature portion with respect to the ambient temperature portion, thus raising the possibility of high unbalance forces during operation.

SUMMARY OF THE INVENTION

In order to properly mount the cryogenic temperature portion, a supporting arrangement meeting the following requirements is provided by the present invention: (1) sufficient strength to prevent relative motion between the ambient temperature and cryogenic temperature portions which would cause high unbalance forces; (2) limited heat conduction between the ambient temperature cryogenic temperature portions which would otherwise cause excessive "boil-off" of the cryogenic material; (3) fine adjustment of the relative positioning of the ambient temperature and cryogenic temperature portions is provided in order to align the respective centers of rotation for good dynamic balance; and (4) thermal motion between the ambient temperature and cryogenic temperature portions during cooling of the cryogenic temperature portion to cryogenic temperature is absorbed.

To meet the foregoing requirements, an improved superconducting dynamoelectric machine is provided. This machine has a conventional stator, while the rotor has an improved arrangement for supporting a cryogenic temperature portion on an ambient temperature portion. Although this description is undertaken with respect to the rotor of a superconducting dynamoelectric machine, it should be recognized that the invention is equally applicable to any situation in which it is desired to securely and accurately mount a cryogenic temperature portion while minimizing heat losses.

In the improved supporting arrangement, the ambient temperature portion is connected to the cryogenic temperature portion by a series of relatively long and thin support spokes. Each of the support spokes has a first section with one end thereof fixed to the ambient temperature portion by a ball and socket arrangment. The other end of the first section is threaded with threads having a first pitch. A second section of each support spoke has one thereof fixed to a support flange, such as a support ring, by a ball and socket arrangement. The other end of the second section is threaded with theads having a pitch slightly different than the pitch of the threads on the first section.

In constructing the support spoke and the support flange or ring, materials are utilized having coefficients of thermal expansion such that the resulting contractions of the spokes along their length are offset by the contraction of the support flange or ring in the same direction. Thermal contraction in the direction transverse to the length of the spokes, such as in the axial direction of the cylindrical rotor, may be compensated by initially positioning the end of each spoke fixed to the ambient temperature portion in the direction in which axial contraction will occur. The displacement of this end of the spoke, with respect to the other end fixed to the support ring, should be by an amount equal to the amount which the end fixed to the support ring will move when the cryogenic temperature portion is cooled to cryogenic temperature.

A connector, such as a threaded nut, is utilized to interconnect the threaded ends of the two sections of each spoke. As the pitches of the threads on the sections of the spoke are different by a slight amount, actuation or rotation of the nut will result in the nut advancing toward the fixed end of one of the sections at a greater rate than it retreats from the fixed end of the other section. Thus, by appropriate selection of the difference in the pitches, the tension of the spokes and the alignment of the ambient temperature and cryogenic portions may be accurately established.

As many spokes as desired may be utilized, but a minimum of three is desirable in order to achieve precision alignment. Also, in order to increase the stiffness of the support, additional sets of three or more support spokes may be located along the axis of the machine.

The foregoing and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 1 is a schematic axial cross-sectional view of a superconducting dynamoelectric machine constructed in accordance with the present invention;

FIG. 2 is an enlarged partial sectional view illustrating the support arrangement of the present invention taken along lines 2—2 of FIG. 1;

FIG. 3 is a schematic transverse cross-sectional view of the machine of FIG. 1 illustrating the placement of additional sets of support spokes.

DETAILED DESCRIPTION OF THE PREFERRED EMBODIMENT

In FIG. 1 there is illustrated a superconducting dynamoelectric machine having a generally cylindrical stator 11. A rotor 13 has a generally cylindrical portion 15 at ambient temperature and a generally cylindrical portion 17 at ambient temperature and a generally cylindrical portion 17 at cryogenic temperature. One end of portion 17 is supported on portion 15 by a generally cylindrical tubular structure 19. Tubular structure 19 is sufficiently strong to transmit machine torque between the field winding and the prime mover. The other end of the cryogenic temperature rotor portion 17 is connected to the ambient temperature portion 15 by a supporting arrangement 20. Supporting arrangement 20 includes a generally cylindrical flange or ring 21 that is attached to the end of the cryogenic temperature portion 17 away from the tubular support 19. Support spokes 23 interconnect flange or ring 21 with the ambient temperature portion 15 of the rotor 13.

Ambient temperature portion 15 of rotor 13 has shafts 25 and 27 affixed to the ends thereof. Shafts 25 and 27 ride on bearings 29 and 31, respectively, to support rotor 13.

Supporting arrangement 20 is illustrated in greater detail in FIG. 2. Support spokes 23 are relatively long and thin, with the design representing a compromise between the required stiffness and the allowable heat loss. The radial stiffness of support arrangement 20 may be expressed as $K_{eg} = 2L/NAE$ where:

$K_{eg}$ = radial spring constant
$N$ = number of spokes
$A$ = cross-sectional area of a single spoke $L$ = length of a single spoke $E$ = modulus of elasticity of spoke material By analyzing the thermal conditions for the support structure, it may be determined that the heat conduction down a spoke is given by the formula:

$A/L \int K(T)dt$ where:
$K(T)$ = thermal conductivity
$T$ = temperature

Thus, it may be seen that both the radial stiffness and the heat loss are a function of $A/L$. In order to give maximum radial stiffness, this quantity should have the largest possible value, while to hold heat loss to a minimum this ratio should have as small a value as possible. Accordingly the ultimate design must be a compromise between these conflicting requirements. Each of the support spokes 23, as illustrated in FIG. 2, includes a first spoke section 33 and a second spoke section 35. One end of the spoke section 33 is affixed to an area 37 of the ambient temperature rotor portion 15 by a ball and socket arrangement 39. The ball and socket arrangement 39 permits some pivoting of this end of the spoke 23 when there is movement of the other end of the spoke, such as by contraction in the direction along the axis of the machine. Passage 41 through area 37 and passage 43 through the flange or ring 21 are appropriately constructed so as to not interfere with such motion of the spoke 23.

One end of spoke section 35 is similarly affixed to the support ring 21 by a ball and socket arrangement 45. A passage 47 through ring 21 is appropriately designed to not bind section 35 as a result of movement of the ball and socket arrangements 43 during axial contraction.

The other ends of spoke sections 33 and 35 are threaded with threads 49 and 51, respectively. The pitch of threads 49 and 51 is made slightly different, and an adjusting nut 53 is threaded to engage both the threads 49 and 51. With the slightly different pitch of the threads 49 and 51, rotation of nut 53 will cause it to move toward the fixed end of one of the sections 33 or 35 at a greater rate than it retreats from the fixed end of the other section. For example, assume that the threads 49 have a slightly greater pitch than the threads 51. Rotation of nut 53 in the direction that causes it to move toward the fixed end of section 33 results in such movement at a rate determined by the pitch of the threads 49. At the same time, nut 53 will be disengaging the threads 51 at a rate determined by the pitch thereof. Since the pitch of the threads 51 is being assumed to be less than the pitch of the threads 49, the movement of nut 53 towards the ball and socket arrangement 39 is greater than the rate of movement away from the ball and socket arrangement 45. As a result, an increase of tension in the spoke 23 is achieved by an amount depending upon the difference in the pitches of the threads 49 and 51. Rotation of nut 53 in the opposite direction will produce a similar reduction in the tension. In addition, the alignment of cryogenic temperature rotor portion 17 with respect to ambient temperature rotor portion 15 may be adjusted in this fashion.

Therefore, a precision adjusting arrangement is provided without the use of very fine threads, which are not acceptable in this application. To further explain the operation of this arrangement, assume that the threads 49 have $N_1$ threads per inch and that the threads 51 have $N_2$ threads per inch. Thus, the motion per turn of the adjusting nut 53 will be given by the equation:

$S = (1/N_2 - 1/N_1)$ or $(N_1 - N_2) N_1 N_2$

Therefore, as the adjusting nut 53 is rotated, the slow precise tightening or loosening referred to above will be achieved. In practice, the nuts of the various spokes would first be adjusted to provide the precise radial positioning required between the ambient temperature portion 15 and the cryogenic temperature portion 17 to prevent the unbalance forces that would result from misalignment. After the proper alignment has been achieved, the adjusting nuts would be tightened uniformly to set the desired tension in the spokes 23.

During the time that the cryogenic temperature rotor portion 17 is being cooled from ambient temperature to cryogenic temperature, thermal contractions are encountered which can produce undesired, and possibly extremely high stresses. These thermal contractions occur along the lengths of the spokes 23 and along the axis of the machine in the direction indicated by arrow 55. In order to prevent the production of undue stresses, the spokes 23 and the support ring 21 are made of materials having coefficients of thermal expansion such that the radial contraction of the spokes 23 is offset by radial contraction of the ring 21. Due to the differences in the structures, this would normally require dissimilar metals. As a specific example, it has been found that if the support ring 21 is fabricated from a stainless steel, such as the American Society of Testing Materials, Type 304 Stainless Steel, and if the spokes 23 are fabricated from a high nickel alloy, such as that known by the trademark "Inconel" of International Nickel, the rise in pre-load tension during cooling is very low.

Axial contraction in the direction of arrow 55 may be countered in two ways. First of all, the ball and socket arrangements 39 and 45 absorb some relative displacement of the ends of spokes 23 without producing bending stresses. In addition, the end of spoke section 33 at ball and socket arrangement 39 is initially displaced (i.e., before the rotor portion 17 is cooled from ambient to cryogenic temperature), in the direction of axial contraction. The amount of displacement of this fixed end of spoke section 33 is equal to the amount of displacement that will be evidenced by the fixed end of spoke section 35 as a result of the thermal contraction of the cryogenic temperature portion 17 during the period when it is cooled from ambient to cryogenic temperature. Thus, as a result of the axial contraction during cool down, the ball and socket arrangement 45 will end up in alignment with the ball and socket arrangement 39 and the spoke 23 will be straight during operation of the superconducting machine.

The number of spokes 23 may be varied as required or desired for particular application. However, in the superconducting dynamoelectric machine application of this preferred embodiment it is desired to utilize at least three such spokes in order to achieve the desired precision in the alignment of the ambient temperature portion 15 and the cryogenic temperature portion 17 of the rotor.

In order to provide increased stiffness for the support of the cryogenic temperature rotor portion 17, spokes 23 may be formed in sets and spaced along the axis of the superconducting dynamoelectric machine. Each of the sets would, in this preferred embodiment, incorporate at least three spokes 23, for the reason indicated above. FIG. 3 illustrates the utilization of two sets of three spokes. In order to offset the torque reaction caused by the actual displacement of the sets of spokes, the spokes in the second set would have to be rotated 180° from the corresponding spokes in the first.

To distinguish the different spokes in the drawing of FIG. 3, reference will be made to the adjusting nuts for those spokes, since the individual spokes cannot be readily discerned due to the exact 180° displacement of the spokes in one set with respect to the spokes in the other set. Thus, it may be seen that the spokes associated with nuts 57, 59 and 61 are located along the axis extending into the plane of FIG. 3 at a greater distance from the observer than the spokes associated with nut 63, 65 and 67. Thus, it may be seen that the ball and socket arrangements 39 of the farther set of spokes are each located opposite a corresponding ball and socket arrangement of the nearer set of spokes. In this fashion, the desired additional stiffness may be obtained without and adverse torque reaction resulting from the axial displacement of the sets of spokes.

It should be understood that various modifications, changes and variations may be made in the arrangements, operations and details of construction of the elements disclosed herein without departing from the spirit and scope of the present invention. For example, instead of the cryogenic temperature rotor portion being internal with respect to the ambient temperature rotor portion 15, it might in some cases be external thereto. Also, it might not be necessary for some embodiments to locate the annular support ring 21 at the outer perimeter of the cryogenic temperature portion, as shown, and in fact the support flange need not even be a ring for some applications. Further, the support arrangement disclosed herein may also have applicability outside dynamoelectric machinery and may be utilized wherever it is necessary to support a cryogenic structure with respect to an ambient temperature structure.

I claim:

1. A superconducting dynamoelectric machine comprising:
    a generally cylindrical stator;
    a generally cylindrical first rotor portion at ambient temperature concentric with said stator;
    a generally cylindrical second rotor portion at cryogenic temperature concentric with said first rotor portion;
    a generally cylindrical support ring associated with said second rotor portion, said support ring being constructed of a material having a first coefficient of thermal expansion; and
    a plurality of generally radially extending support spokes interconnecting said first and second rotor portions, each of said spokes having one end connected to said first rotor portion and the other end connected to said support ring, said support spokes being constructed of a material having a second coefficient of thermal expansion selected so that said support ring and said support spokes contract an equal amount in the radial direction when said second rotor portion is cooled to cryogenic temperature.

2. A superconducting dynamoelectric machine as claimed in claim 1 wherein the ends of said support spokes are connected to said first rotor portion and said support ring by ball and socket arrangements.

3. A superconducting dynamoelectric machine as claimed in claim 1 wherein the ends of said support spokes connected to said first rotor portion are axially displaced, when said second rotor portion is at ambient temperature, from the ends connected to said support ring in the direction of axial contraction by the amount of contraction that will occur in the axial direction when said second rotor portion is cooled to cryogenic temperature.

4. A superconducting dynamoelectric machine as claimed in claim 1 wherein said support spokes are in a set of at least three spokes.

5. A superconducting dynamoelectric machine as claimed in claim 1 wherein said support spokes are in a plurality of axially displaced sets.

6. A superconducting dynamoelectric machine as claimed in claim 1 wherein:
   said support ring is attached to one end of said second rotor portion; and
   a tubular structure connects the other end of said second rotor portion to said first rotor portion.

7. A superconducting dynamoelectric machine as claimed in claim 1 wherein each of said support spokes comprises:
   a first spoke section;
   a second spoke section; and
   connecting means to adjustably interconnect said first and second spoke sections to permit precise alignment and desired spoke tension.

8. A superconducting dynamoelectric machine as claimed in claim 7 wherein:
   the end of said first spoke section adjacent said connecting means is threaded with threads having a first pitch;
   the end of said second spoke section adjacent said connecting means is threaded with threads having a second pitch slightly different from said first pitch; and
   said connection means is a nut engaging said threads of said first and second spoke sections and adapted upon actuation to advance along one of said spoke sections at a slightly different rate than it backs off along the length of the other of said spoke sections, thereby permitting extremely precise adjustment.

9. A superconducting dynamoelectric machine as claimed in claim 2 wherein the ends of said support spokes connected to said first rotor portion are axially displaced, when said second rotor portion is at ambient temperature, from the ends connected to said support ring in the direction of axial contraction by the amount of contraction that will occur in the axial direction when said second rotor portion is cooled to cryogenic temperature.

10. A superconducting dynamoelectric machine as claimed in claim 7 wherein each of said support spokes comprises:
    a first spoke section having one end fixed to said first rotor portion and the other end threaded with threads having a first pitch;
    a second spoke section having one end fixed to said support ring and the other end threaded with threads being a second pitch slightly different from said first pitch; and
    a nut threaded at each end to engage the respective threads of said first and second spoke sections, rotation of said nut causing said nut to advance toward the fixed end of one of said spoke sections at a slightly different rate than it retreats from the fixed end of the other of said spoke sections to permit precise adjustment of the alignment of said first and second rotor portions and the tension of said support spokes.

11. A superconducting dynamoelectric machine rotor comprising:
    a generally cylindrical first rotor portion at ambient temperature;
    a generally cylindrical second rotor portion at cryogenic temperature concentric with said first rotor portion;
    a support ring associated with said second rotor portion, said support ring being constructed of a material having a first coefficient of thermal expansion; and
    a plurality of generally radially extending support spokes interconnecting said first and second rotor portions, each of said spokes having one end connected to said first rotor portion and the other end connected to said support ring, said support spokes being constructed of a material having a second coefficient of thermal expansion selected so that said support ring and said support spokes contract an equal amount in the radial direction when said second rotor portion is cooled to cryogenic temperature.

12. A superconducting dynamoelectric machine rotor as claimed in claim 11 wherein each of said support spokes comprises:
    a first spoke section having one end fixed to said first rotor portion by a ball and socket arrangement and the other end threaded with threads having a first pitch;
    a second spoke section having one end fixed to said support ring by a ball and socket arrangment and the other end threaded with threads having a second pitch, the fixed end of said first spoke section being axially displaced from the fixed end of said second spoke section in the direction of axial contraction by the amount of contraction that will occur in the axial direction when said second rotor portion is cooled to cryogenic temperature; and
    a nut threaded at each end to engage the respective threads of said first and second spoke sections, rotation of said nut causing said nut to advance toward the fixed end of one of said spoke sections at a slightly different rate than said nut retreats from the fixed end of the other of said spoke sections to permit precise adjustment of the alignment of said first and second rotor portions and the tension of said support spokes.

* * * * *